United States Patent
Parsons et al.

(10) Patent No.: US 12,404,007 B2
(45) Date of Patent: Sep. 2, 2025

(54) DUCTED FAN AIRCRAFT PROPULSION SYSTEM

(71) Applicant: ROLLS-ROYCE plc, London (GB)

(72) Inventors: Jonathan M Parsons, Derby (GB); Elyse M Marshall, Derby (GB); Sibylle Rerolle, London (GB); Nadav Grunberg, London (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/792,688

(22) Filed: Aug. 2, 2024

(65) Prior Publication Data
US 2025/0074577 A1  Mar. 6, 2025

(30) Foreign Application Priority Data
Aug. 30, 2023 (GB) ........................ 2313173

(51) Int. Cl.
*B64C 11/00* (2006.01)
*B64C 39/06* (2006.01)

(52) U.S. Cl.
CPC .......... *B64C 11/001* (2013.01); *B64C 39/062* (2013.01)

(58) Field of Classification Search
CPC ....... B64C 11/00; B64C 11/001; B64C 11/02; B64C 29/0016; B64C 29/0025; B64C 39/06; B64C 39/062; B64C 39/064; B64C 39/066; B64C 39/068
USPC ...................................................... 244/73 R
See application file for complete search history.

(56) References Cited

U.S. PATENT DOCUMENTS

| | | | | |
|---|---|---|---|---|
| 1,440,242 A | * | 12/1922 | Robertson | B64C 29/02 440/47 |
| 2,922,277 A | * | 1/1960 | Bertin | F02K 1/36 180/129 |
| 2,967,029 A | * | 1/1961 | Hill | B64C 29/0016 244/23 C |
| 3,054,578 A | * | 9/1962 | Marie | B64C 27/20 244/23 C |

(Continued)

FOREIGN PATENT DOCUMENTS

CN  211810264 U  10/2020
DE  944 102 C  6/1956

(Continued)

OTHER PUBLICATIONS

Jan. 26, 2024 Search Report issued in British Patent Application No. 2313173.3.

*Primary Examiner* — Joshua E Rodden
(74) *Attorney, Agent, or Firm* — Oliff PLC

(57) ABSTRACT

The disclosure relates to a ducted fan aircraft propulsion system and to an aircraft incorporating such a propulsion system. Example embodiments include a ducted fan aircraft propulsion system (300), including: a duct (301); a central body portion (302) having first and second ends (303, 304) and extending through the duct (301); a payload portion (305) extending from the first end (303) of the central body portion (302); and a rotor (306) extending across an internal volume (307) of the duct (301) from the central body portion (302), wherein the duct (301) includes an outwardly flared inlet end (308) such that an inlet air flow passage (309) between the central body portion (302) and an inner surface (310) of the duct (301) has a sectional area that decreases from the inlet end (308) of the duct (301) to the rotor (306).

12 Claims, 6 Drawing Sheets

(56) References Cited

U.S. PATENT DOCUMENTS

| | | | | |
|---|---|---|---|---|
| 3,066,888 | A * | 12/1962 | Doak | B64C 29/0016 |
| | | | | 244/100 R |
| 3,101,917 | A * | 8/1963 | Sudrow | B64C 11/001 |
| | | | | 244/23 C |
| 3,128,062 | A | 4/1964 | Marie | |
| 3,135,481 | A | 6/1964 | Sudrow | |
| 3,276,723 | A * | 10/1966 | Miller | B64C 29/0025 |
| | | | | 244/23 C |
| 4,446,696 | A | 5/1984 | Sargisson et al. | |
| 4,795,111 | A * | 1/1989 | Moller | B64U 30/26 |
| | | | | 244/100 R |
| 5,295,643 | A * | 3/1994 | Ebbert | B64U 10/13 |
| | | | | 428/117 |
| 5,996,933 | A | 12/1999 | Schier | |
| 7,201,346 | B2 * | 4/2007 | Hansen | B64U 10/20 |
| | | | | 244/12.1 |
| 8,821,123 | B2 * | 9/2014 | Camci | F04D 29/541 |
| | | | | 416/189 |
| 9,975,633 | B1 * | 5/2018 | Johnson | B64C 11/001 |
| 10,814,974 | B2 | 10/2020 | Randall | |
| 12,037,118 | B2 * | 7/2024 | Melcher | B64C 37/00 |
| 2003/0127559 | A1 * | 7/2003 | Walmsley | B64C 29/0066 |
| | | | | 244/23 C |
| 2011/0147533 | A1 * | 6/2011 | Goossen | B64U 10/13 |
| | | | | 415/13 |
| 2015/0226086 | A1 | 8/2015 | Samuelson | |
| 2019/0300150 | A1 * | 10/2019 | O'Brien | B64U 10/14 |
| 2020/0189737 | A1 * | 6/2020 | Lim | B64U 30/26 |
| 2020/0407043 | A1 * | 12/2020 | Ajumobi | B64C 11/001 |

FOREIGN PATENT DOCUMENTS

| | | |
|---|---|---|
| GB | 1 540 068 A | 2/1979 |
| JP | 2002-337794 A | 11/2002 |
| WO | 2007/052271 A2 | 5/2007 |
| WO | 2016/103550 A1 | 6/2016 |
| WO | 2018/089067 A2 | 5/2018 |

\* cited by examiner

DUCTED FAN AIRCRAFT PROPULSION SYSTEM

This specification is based upon and claims the benefit of priority from UK Patent Application Number 2313173.3 filed on 30 Aug. 2023, the entire contents of which are incorporated herein by reference.

BACKGROUND

Technical Field

The disclosure relates to a ducted fan aircraft propulsion system and to an aircraft incorporating such a propulsion system.

Background of the Disclosure

Certain types of vertical take-off and landing (VTOL) aircraft may use one or more ducted fans for lift and propulsion. A ducted fan is a thrust-generating mechanical fan or propellor that is mounted within a cylindrical duct or shroud. An example of an aircraft with a ducted fan is a coleopter, which uses a ducted fan as the primary fuselage of the aircraft. Multiple ducted fans may be employed in manned or unmanned aircraft. Advantages of ducted fans include lower noise, improved efficiency (due to reduced rotor tip losses) and a reduced rotor size. This may, however, lead to aircraft with a high disk loading (i.e. the ratio of weight of an aircraft to the total main rotor disc area) or a reduced payload capability and consequent higher power consumption during hover.

FIG. 1 illustrates schematically a relationship between hover lift efficiency in terms of gross weight per unit power (in kg/kW) as a function of disc loading in terms of gross weight per unit thrust area (in kg/m$^2$). Helicopters have a relatively low disc loading and a high hover lift efficiency, while VTOL aircraft have a relatively high disc loading and a low hover lift efficiency. Other aircraft such as tilt rotor, tilt wing and lift-fan aircraft lie between these extremes.

FIG. 2 illustrates an example straight duct design for a ducted fan. The duct 200 has a circular cross section and comprises an inner surface 201 defining a uniform cross-sectional area along a longitudinal axis 202 of the duct 200. An outer surface 203 of the duct has a uniform diameter along a first portion 204 of the duct 200 and a tapering diameter along a second portion 205 of the duct 200 towards an outlet end 206. A rotor (not shown) provided within the interior of the duct forces airflow through the duct 200 from an inlet 207 to the outlet 206, providing thrust for an aircraft.

A general problem to be addressed is how to improve the hover lift efficiency of a ducted fan propulsion system.

SUMMARY

According to a first aspect there is provided a ducted fan aircraft propulsion system, comprising:
 a duct;
 a central body portion having first and second ends and extending through the duct;
 a payload portion extending from the first end of the central body portion; and
 a rotor extending from the central body portion within the duct,
 wherein the duct comprises an outwardly flared inlet end such that an inlet air flow passage between the central body portion and an inner surface of the duct has a sectional area that decreases from the inlet end of the duct to the rotor.

The reducing air flow passage encourages a larger volume of air into the duct, which aids lift due to the flared inlet end of the annular wing, thereby improving the hover lift efficiency of the aircraft.

The duct may comprise an outwardly flared outlet end such that an outlet air flow passage between the central body portion and the inner surface of the duct has a sectional area that increases from the rotor to the outlet end of the duct. The increase in sectional area from the rotor to the outlet end of the duct may be smaller than the decrease in sectional area from the inlet end to the rotor.

The duct may form an annular wing having a decreasing cross-section from the inlet end of the duct to the outlet end of the duct.

The rotor may be positioned within the duct extending across a minimum of the sectional area of the duct.

An upper part of an outer surface of the payload portion may define a spheroidal shape. The spheroidal shape may for example be an oblate spheroid having a shorter axis along a longitudinal axis of the central body portion.

A lower part of the outer surface of the payload portion may taper from the spheroidal shape to the central body portion.

The central body portion may comprise a motor connected to drive the rotor via a rotor shaft. The motor may be electric. The system may comprise an electric storage unit and an electric power controller configured to provide electric power to the motor.

According to a second aspect there is provided an aircraft comprising a ducted fan propulsion system according to the first aspect.

The aircraft may comprise a single ducted fan propulsion system.

The duct may form an outer fuselage of the aircraft.

The aircraft may be a coleopter.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
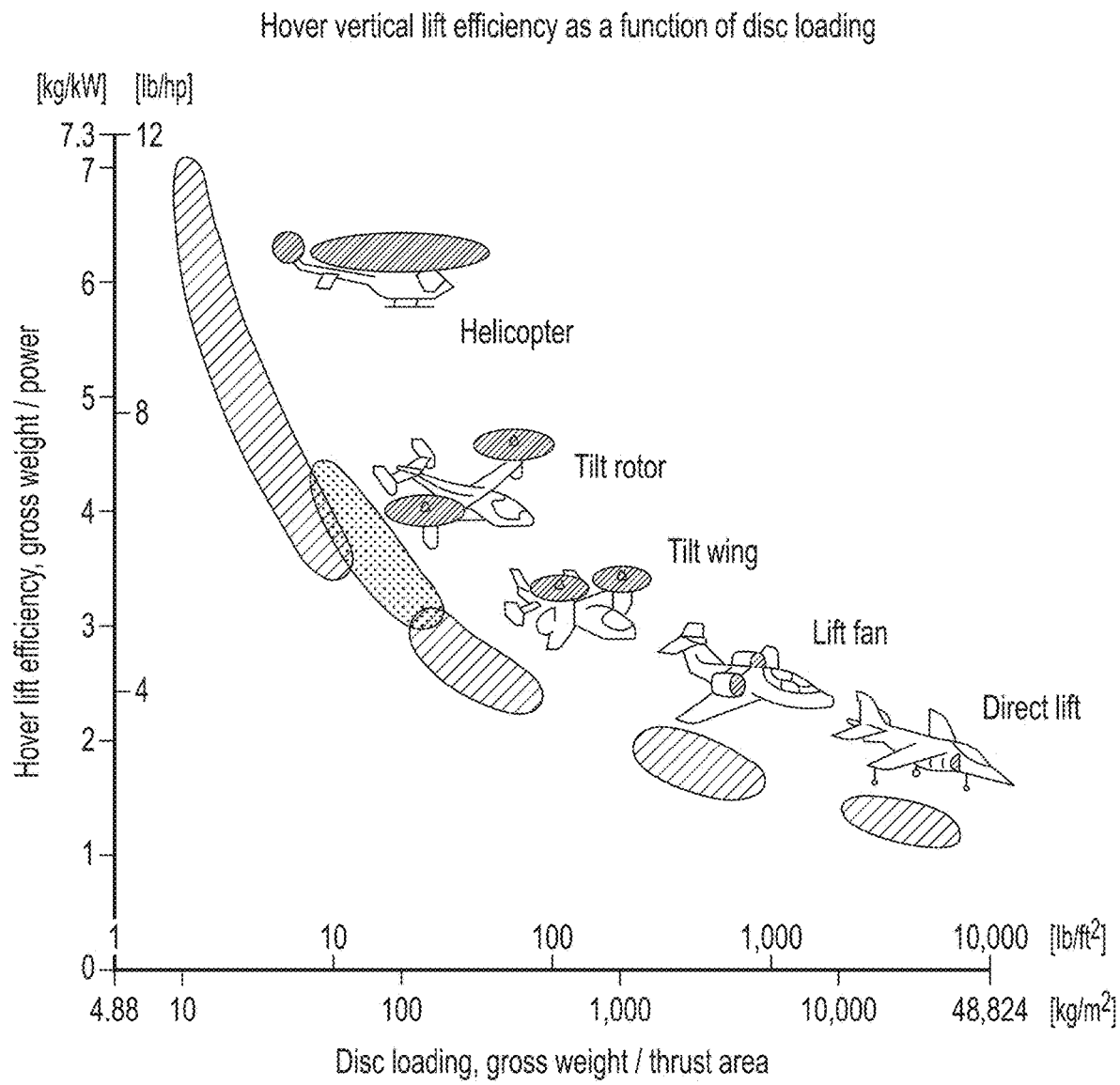
FIG. 1 is a chart illustrating hover lift efficiency as a function of disc loading (derived from https://www.wikiwand.com/en/Disk_loading)

FIGS. 3, 4, 5a and 5b illustrate an example design for a ducted fan propulsion system 300. The system 300 comprises a duct 301 surrounding a central body portion 302. The central body portion 302 extends through the duct 301 from a first end 303 to a second end 304. A payload portion 305 extends from the first end 303 of the central body portion 302. A rotor 306 extends across an internal volume 307 of the duct from the central body portion 302. The system 300 is rotationally symmetric about a central axis 311 extending through the central body portion 302.

The duct 301 comprises an outwardly flared inlet end 308 such that an annular inlet air flow passage 309 between an outer surface of the central body portion 302 and an inner surface 310 of the duct 301 has a sectional area that decreases from the inlet end 308 of the duct 301 to the rotor 306.

Figures 3, 4:
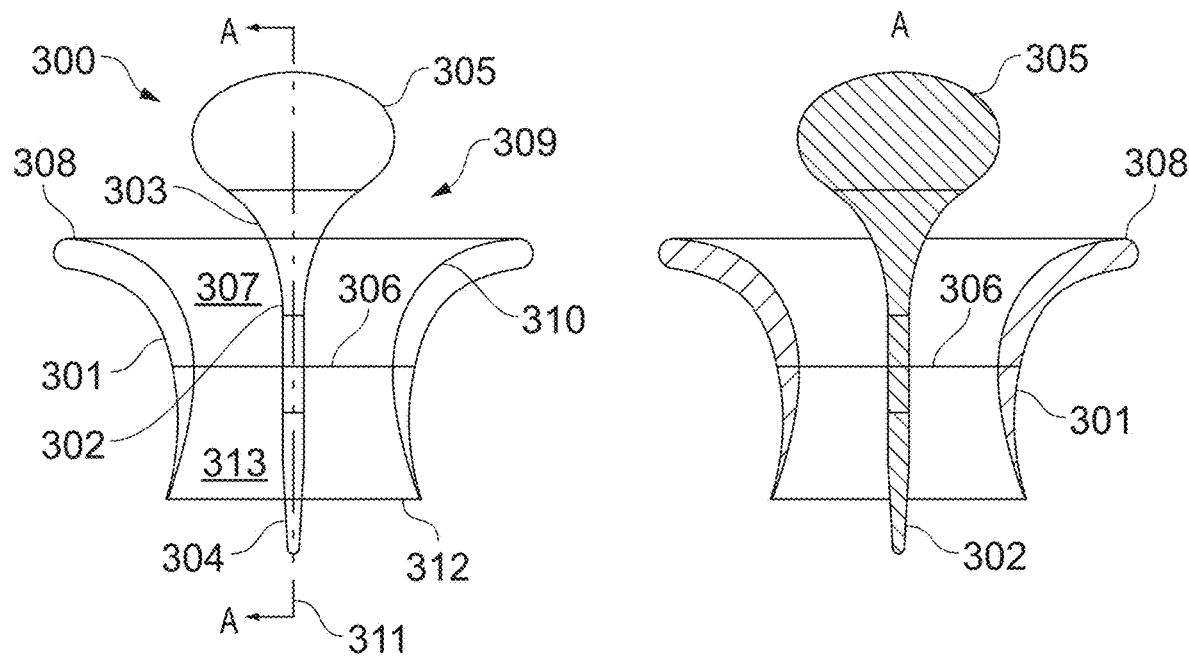
FIG. 3 is a line drawing of an example design for a ducted fan aircraft propulsion system.
FIG. 4 is a cross-sectional drawing of the example ducted fan aircraft propulsion system of FIG. 3.

In the example system 300 in FIG. 3, the duct 301 also comprises an outwardly flared outlet end 312 such that an outlet air passage 313 between the central body portion 302 and the inner surface 310 of the duct 301 has a sectional area that increases from the rotor 306 to the outlet end 312.

The cross-sectional shape of the duct 301 forms an annular wing having a decreasing cross-section from the inlet end 308 of the duct 301 to the outlet end 312 of the duct 301. The annular wing shape enhances lift of the propulsion system 300 due to airflow through the duct 301. More thrust can thereby be achieved at lower power values, leading to improved hover efficiency.

The rotor 306 is positioned in the middle of the duct 301 at a position where the sectional area of the duct 301 is at a minimum.

The payload portion 305 in FIG. 3 has an upper portion with an outer surface that defines a spheroidal shape. The spheroidal shape in the illustrated example is an oblate spheroid having a shorter axis along the longitudinal axis 311 of the central body portion 302. The payload portion 305 may take other shapes, for example a spherical shape or a prolate spheroidal shape.

Figure 5A:
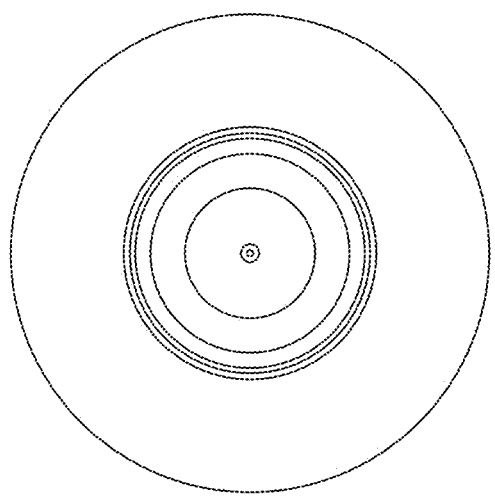
FIG. 5a is a line drawing of a top view of the example ducted fan aircraft propulsion system of FIG. 3.
Figure 5B:
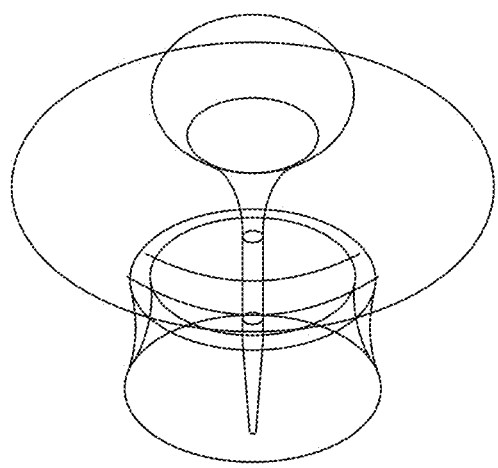
FIG. 5b is a line drawing of a side view of the example ducted fan aircraft propulsion system of FIG. 3.

FIG. 4 illustrates a sectional view of the system 300, which is taken along section A-A indicated in FIG. 3. FIGS. 5a and 5b illustrate a top view and a side view respectively of the system 300.

Figure 6:
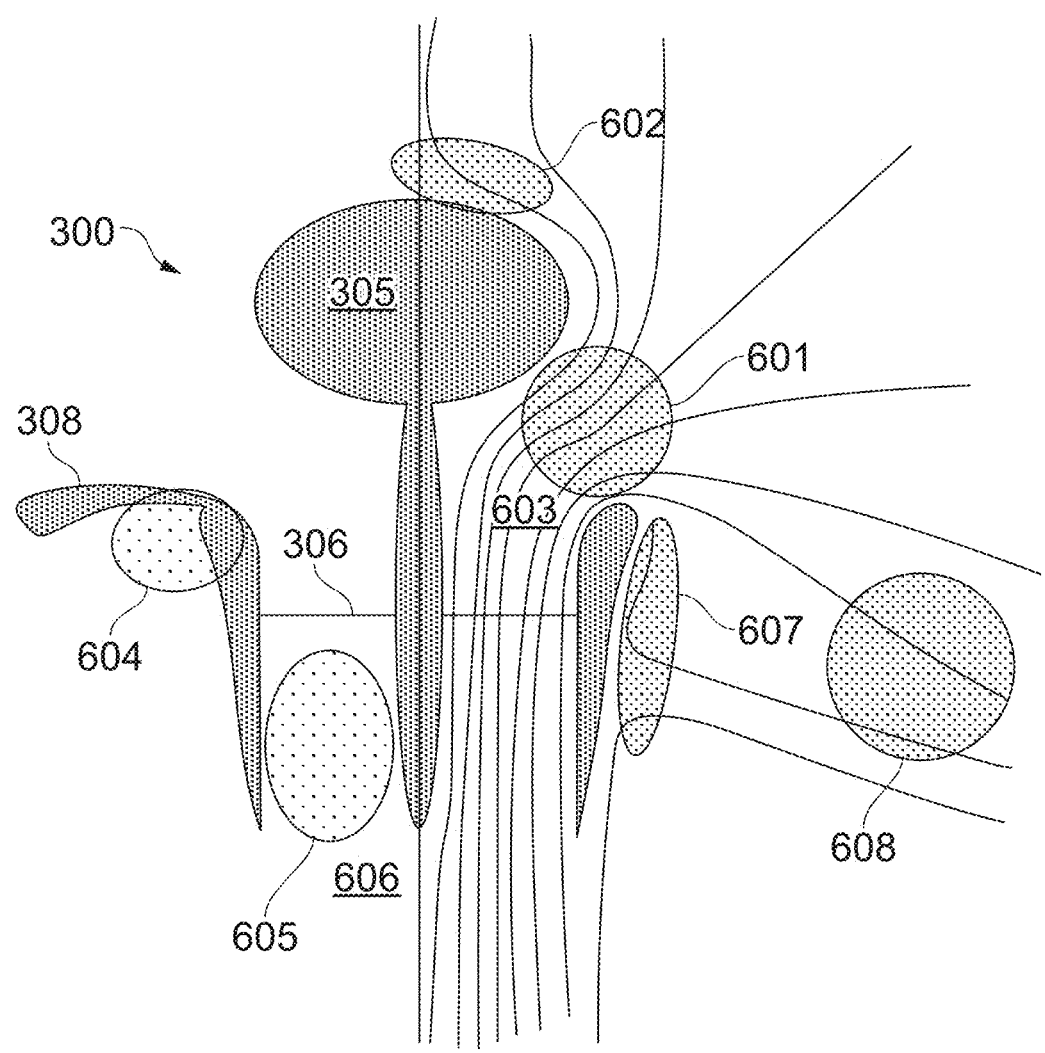
FIG. 6 is a schematic drawing of airflow around and through an example ducted fan.

FIG. 6 is a schematic diagram illustrating how the various geometries of the system 300 increase lift and reduce the work done by the rotor or fan 306. Firstly, the outwardly flared inlet 308 encourages a larger volume 601 of air into the fan 306, with a reducing sectional area between the inlet 308 and the fan 306 having reduced obstruction to airflow. Secondly, the shape of the payload body 305 forms an accelerated flow of air 602 over the payload body 305 and into the duct inlet 603. The shape of the payload body 305 in combination with the outwardly flared shape of the duct inlet end forms a smooth and compressing flow of air through the duct inlet 603. The outwardly flared inlet end 308 maintains a high-pressure volume 604 under annular wing shape of the duct inlet 308, which increases suction over the wing. A low-pressure region 605 is created within the duct between the fan 306 and the duct outlet 606, which creates a high pressure underneath the duct body with expansion at the duct outlet 606.

Airflow 607 around the outer surface of the duct is directed to the inlet 603 and speeded up over the annular wing of the duct. Airflow 608 further away from the duct is not blocked by the annular wing.

Figure 7:
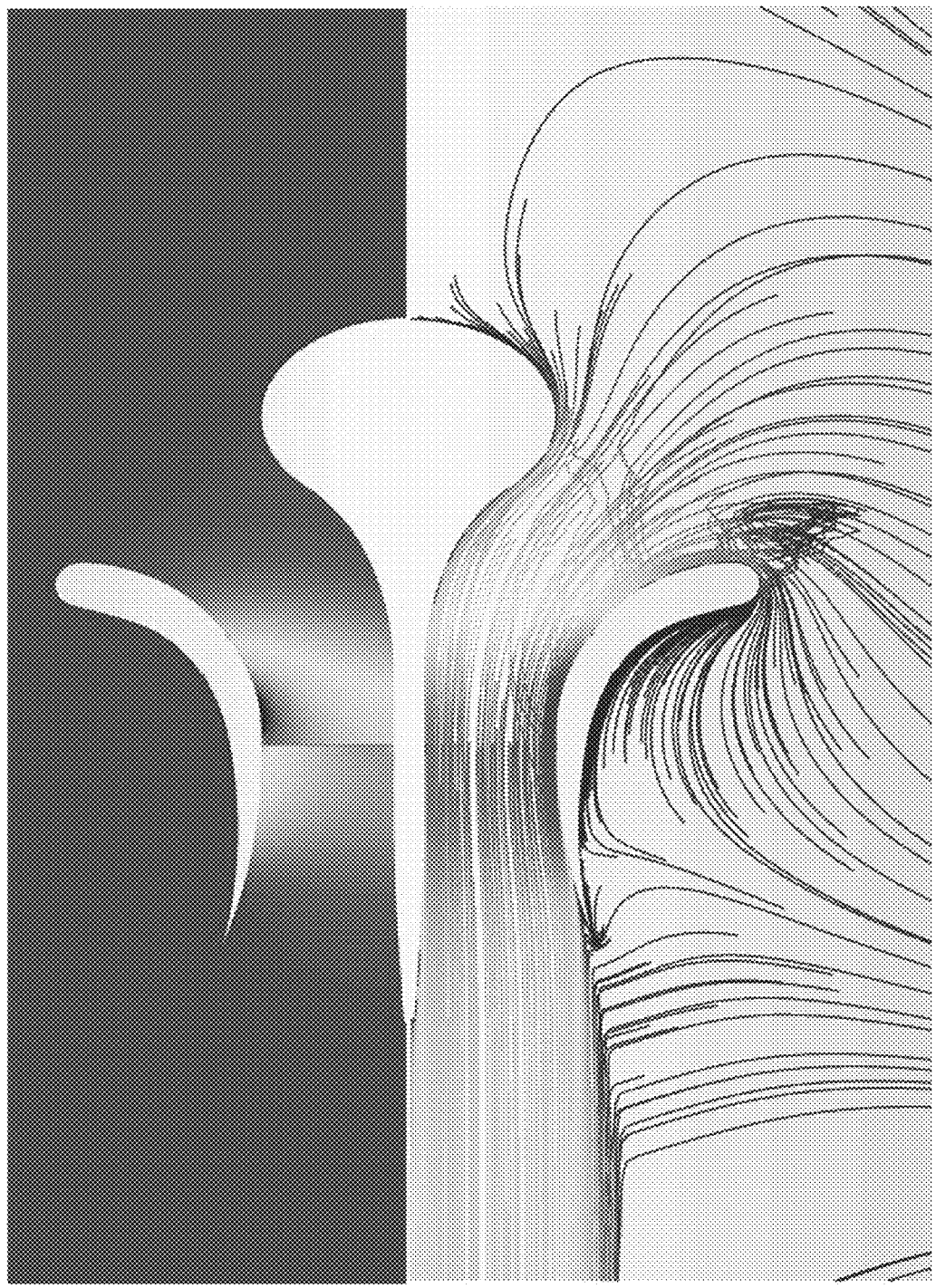
FIG. 7 is an output airflow plot from a computational fluid dynamics model of an example ducted fan.

The general principles illustrated in FIG. 6 and described above are shown in more detail in the plot of FIG. 7, which illustrates results from an Ansys Fluent computational fluid dynamics (CFD) model of the duct and central body portion with the payload portion. The left half of the plot illustrates static pressure, while the right half illustrates velocity streamlines. These are illustrated separately, with associated pressure values and velocity magnitudes, in FIGS. 8 and 9.

Figure 2:
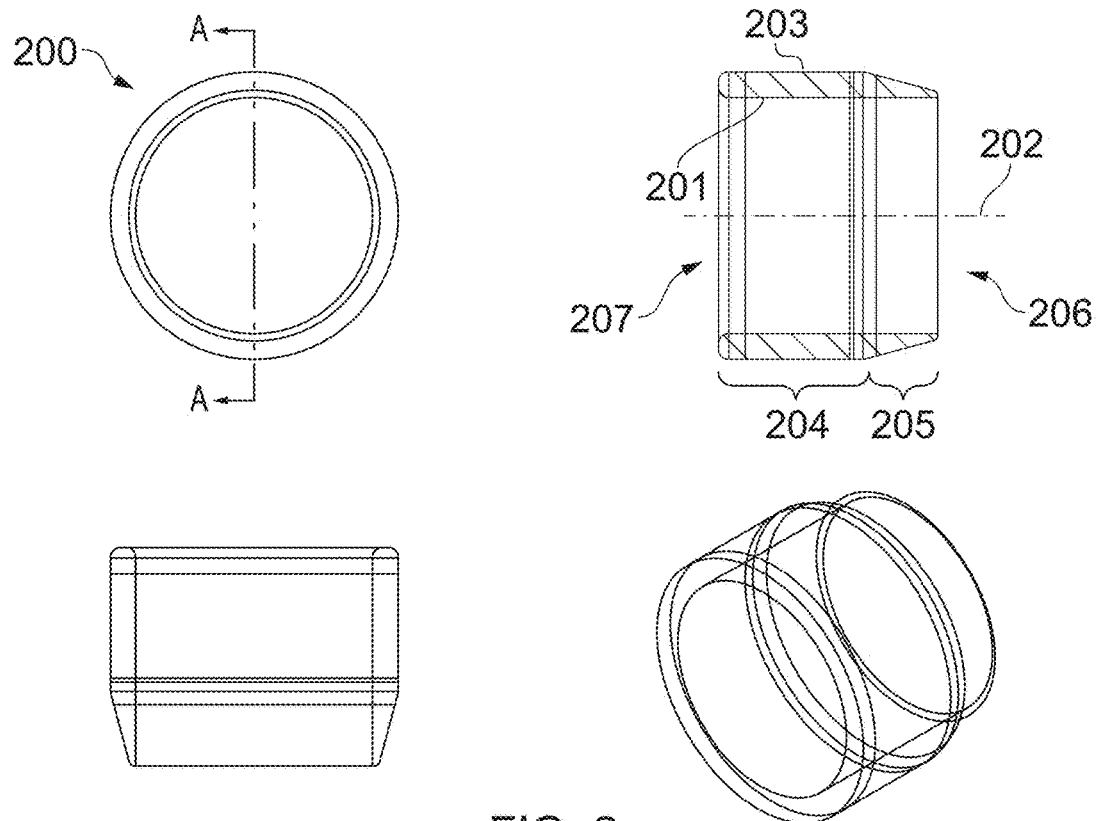
FIG. 2 is a series of line drawings illustrating an example straight duct for a conventional ducted fan.
Figure 8:
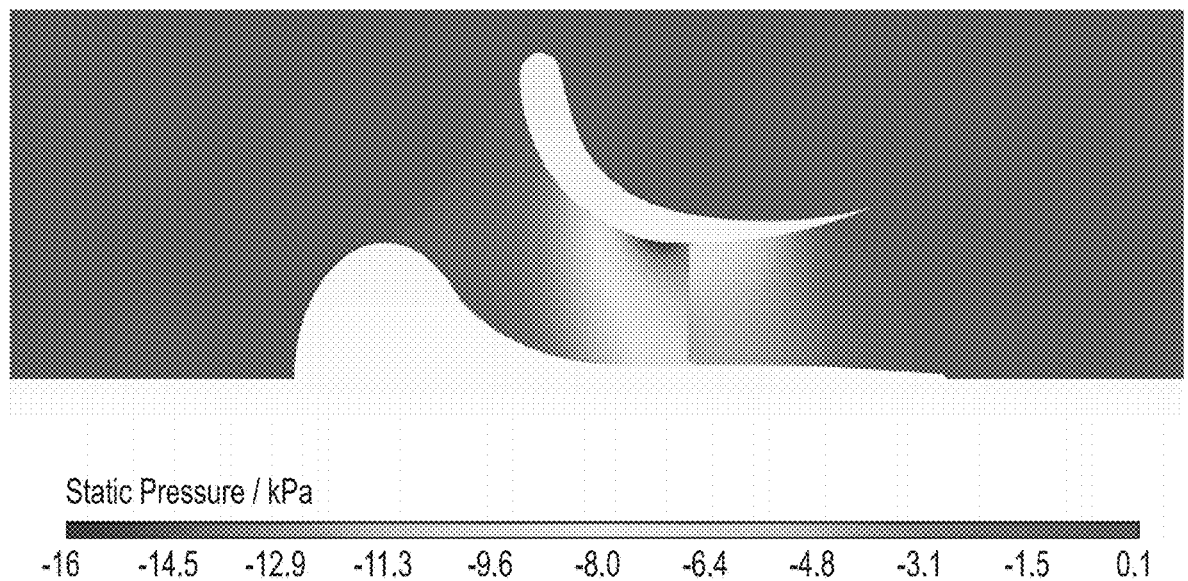
FIG. 8 is an output static pressure plot from a computational fluid dynamics model of an example ducted fan.
Figure 9:
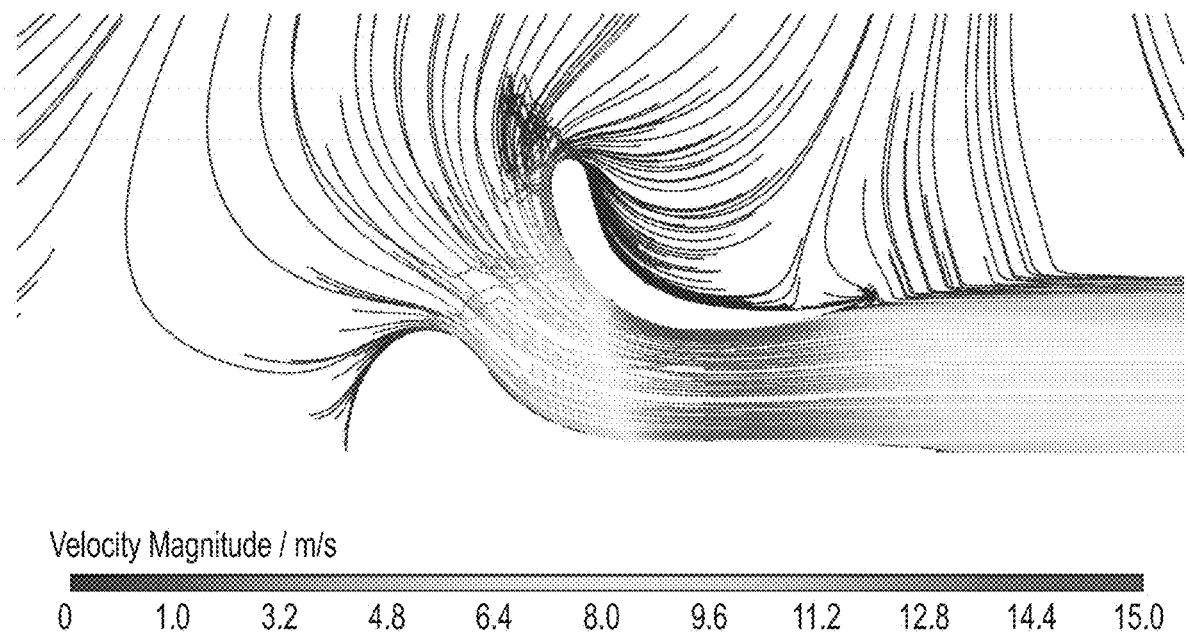
FIG. 9 is an output velocity streamline plot from a computational fluid dynamics model of an example ducted fan.

Based on CFD simulations such as those illustrated in FIGS. 7-9, it was calculated that the duct design can improve lift in hover by around 67% compared with a simple straight duct design, i.e. the duct design of the type illustrated in FIG. 2. This is mirrored in physical prototyping test results on a 1:33 scale model that measured both lift and power of the system, in which a 65.5% improvement in lift efficiency (overall lift/power) was achieved over a simple straight duct design. When the vehicle is experiencing ground effect, a 49% increase in lift efficiency compared to a straight duct design was seen in prototype physical testing.

Considering the trends and results from both CFD and physical prototyping, along with benchmarking of existing products, it is estimated that a vehicle based on the duct design could achieve a hover lift efficiency value of around 2.92 at a disk loading of 439 kgm$^{-2}$ for a 3.1 tonne maximum take-off weight. This would place such an aircraft in a region similar to a tilt wing aircraft in the schematic plot of FIG. 1.

Figure 10:
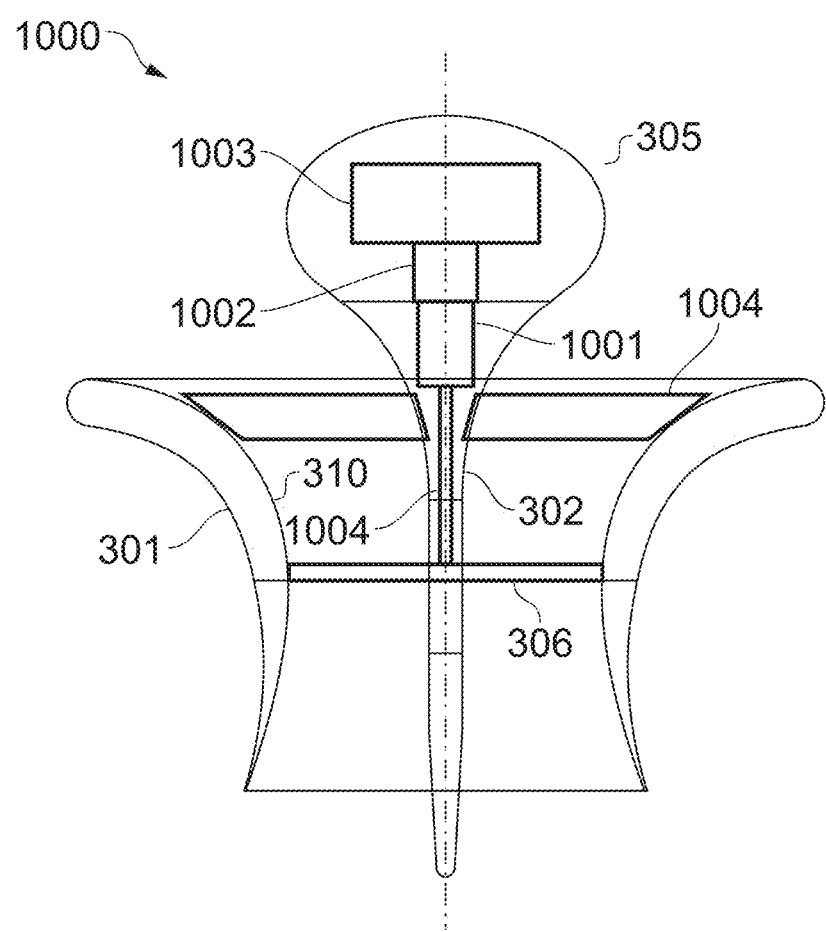
FIG. 10 is a schematic diagram of an example aircraft comprising a ducted fan propulsion system.

FIG. 10 illustrates schematically an example aircraft 1000 with a propulsion system based on the duct design described above. The aircraft 1000 comprises the propulsion system as described above in relation to FIGS. 3-5. Also illustrated schematically in FIG. 10 is a motor 1001 connected to drive a rotor shaft 1004 connected to the rotor 306. The motor 1001 may be an electric motor, which is powered from an electric storage unit 1003 with an electric power controller 1002. The electric storage unit 1003 may comprise a battery module. The electric power controller 1002 may function to control electric power provided to the motor 1002 and to maintain a required voltage supply using a power converter module that is provided with a DC voltage supply from the storage unit 1003. The electric storage unit 1003, controller 1002 and electric motor 1001 may be provided in the payload portion 305, in the central body portion 302 or distributed between the payload portion 305 and the central body portion 302.

The central body portion 302 and the duct 301 are connected to each other by a plurality of struts 1004 extending between the central body portion 302 and the inner surface 310 of the duct 301. The struts 1004 are illustrated in FIG. 10 as extending across an inlet end of the duct 301, but may be provided elsewhere, for example towards the outlet end or closer to the rotor 306 on either the inlet or outlet side.

In the example aircraft 1000 in FIG. 10, a single ducted propulsion system forms the aircraft 1000, making the aircraft take the form of a coleopter. In alternative examples the aircraft may comprise a plurality of ducted fan propulsion systems linked together. Linking multiple systems together may improve stability of the aircraft, particularly during hover.

In an example design, the rotor or fan 306 of the aircraft 1000 may be around 3 m in diameter. The fan may have a maximum speed of 2000 RPM and with a power consumption of around 1100 kW. The duct 301 may have a maximum outer diameter of around 6 m. The shape of the duct 301 is designed in conjunction with the payload body 305 to increase the vehicle lift efficiency, as described above. In a general aspect, an outer diameter of the rotor may be between around 2 and 4 metres and a maximum outer diameter of the duct may be between around 5 and 10 metres. A total weight of the aircraft may be between around 2 and 10 tonnes.

Other embodiments are within the scope of the invention, which is defined by the appended claims.

We claim:

1. A ducted fan aircraft propulsion system, comprising:
   a duct;
   a central body portion having first and second ends and extending through the duct;
   a payload portion extending from the first end of the central body portion, wherein an upper part of an outer surface of the payload portion defines a spheroidal shape; and
   a rotor extending across an internal volume of the duct from the central body portion,
   wherein the duct comprises an outwardly flared inlet end such that an inlet air flow passage between the central body portion and an inner surface of the duct has a sectional area that decreases from the inlet end of the duct to the rotor, and
   wherein a cross-sectional shape of the duct forms an annular wing having a decreasing cross-section from the inlet end of the duct to an outlet end of the duct.

2. The ducted fan aircraft propulsion system of claim 1, wherein the duct comprises an outwardly flared outlet end such that an outlet air flow passage between the central body portion and the inner surface of the duct has a sectional area that increases from the rotor to the outlet end of the duct.

3. The ducted fan aircraft propulsion system of claim 1, wherein the rotor is positioned within the duct extending across a minimum of the sectional area of the duct.

4. The ducted fan aircraft propulsion system of claim 1, wherein the spheroidal shape is an oblate spheroid having a shorter axis along a longitudinal axis of the central body portion.

5. The ducted fan aircraft propulsion system of claim 1, wherein a lower part of the outer surface of the payload portion tapers from the spheroidal shape to the central body portion.

6. The ducted fan aircraft propulsion system of claim 1, comprising a motor connected to drive the rotor via a rotor shaft.

7. The ducted fan aircraft propulsion system of claim 6, wherein the motor is an electric motor.

8. The ducted fan aircraft propulsion system of claim 7, comprising an electric storage unit and an electric power controller configured to provide electric power to the motor.

9. An aircraft comprising the ducted fan aircraft propulsion system according to claim 1.

10. The aircraft of claim 9, wherein the aircraft comprises a single one of the ducted fan aircraft propulsion systems.

11. The aircraft of claim 9, wherein the duct forms an outer fuselage of the aircraft.

12. The aircraft of claim 11, wherein the aircraft is a coleopter.

* * * * *